3,001,972
Patented Sept. 26, 1961

3,001,972
EPOXY RESINS WITH HIGH HEAT DISTORTIONS
Roger M. Christenson and Marco Wismer, Richland Township, Allegheny County, and William R. Hydro, New Kensington, Pa., assignors to Pittsburgh Plate Glass Company, Allegheny County, Pa., a corporation of Pennsylvania
No Drawing. Filed Jan. 26, 1959, Ser. No. 788,730
9 Claims. (Cl. 260—47)

This invention relates to novel polyphenol compounds and to the polyglycidyl ether resins thereof and it has particular relation to polyphenols or polyglycidyl ethers thereof comprising a plurality of aromatic nuclei joined together by alkyl or aralkyl bridge to provide a highly functional molecule adapted for use in forming epoxy resins of exceptionally high heat distortion points.

It has heretofore been disclosed to react polyhydric phenols, such as p,p'-isopropylidenediphenol, known commercially as Bisphenol A, with epichlorohydrin in the presence of an acceptor of hydrochloric acid, such as caustic soda, to form long chain glycidyl ethers that can be cured by heating with curing agents, such as amines, amides, or anhydrides of dicarboxylic acids to form epoxy resins. The epoxy resins are in many respects highly valuable materials and have enjoyed extensive commercial use in such applications as in castings, the embedment of electrical apparatus, impregnation of fabrics and fibrous mats and in coatings of various types.

In certain respects, however, the conventional epoxy resins are not all that might be desired. For example, they tend to cure, when treated with curing agents such as amines, polyamides, or anhydrides, at but a slow rate. Also, the resinous products after curing are lower in resistance to heat or to heat distortion than might be desired.

This invention comprises the discovery that phenols containing a plurality of hydroxyls can be reacted with dihalomethyl substituted aromatic compounds, and substituted dihalomethyl aromatic compounds to provide polyphenols, the molecules of which are of greatly increased functionality, this effect resulting from the bridging together of a plurality of the hydroxylated aromatic nuclei, thus to increase the number of hydroxyls per molecule and to produce a packing of aromatic nuclei in the molecule. The epoxy resins from these compounds are of greatly improved heat distortion characteristics.

Compounds of this type are represented by the formula:

$$Ar_1—CH_2—Ar—CH_2—Ar_1$$

wherein Ar represents an arylene radical and each $Ar_1$ represents a radical derived by removing a hydrogen atom from a nuclear carbon atom of a phenol containing at least two phenolic hydroxyl groups. The groups $Ar_1$ may be the same or different.

Preferably, Ar is a phenylene or a lower alkyl substituted phenylene radical, such as a monomethyl-, dimethyl-, trimethyl-, tetramethyl- or monoethylphenylene radical. However, Ar can also represent other arylene radicals.

Each $Ar_1$ may be derived from a mono- or polynuclear polyphenol. Preferably, the polyphenol is composed of only carbon, hydrogen, and oxygen atoms, with the oxygen atoms being present in hydroxyl (—OH) groups. Examples of such radicals include dihydroxyphenyl, trihydroxyphenyl, tetrahydroxyphenyl, dihydroxydiphenyl, di(hydroxyphenyl)alkane, di(hydroxyphenyl)sulfone and dihydroxynaphthyl groups.

The reaction whereby compounds of the above structure are obtained may be illustrated as follows, wherein resorcinol and 4,6-bis-(chloromethyl)-m-xylene are utilized for illustrative purposes:

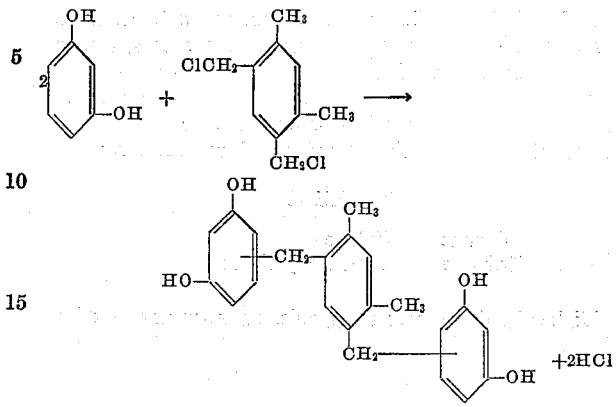

While a specific structure is assigned to the reaction products obtained in the foregoing equation and in the specific examples, it is to be understood that this structure represents what is probably the predominant reaction product and it is quite likely that other reactions occur simultaneously.

Such other reactions include, for example, etherification, which would involve reaction of a halogen atom with the hydroxyl hydrogen atom of the polyphenol, as well as more complex reactions. In any event, it can be seen that the net result of the reaction is to raise markedly the functionality of the phenol utilized.

One very convenient method of forming the polyphenols involves the reaction with a halomethyl substituted benzene, of a polyphenol, or, more specifically, a di- or trihydroxyphenol, such as represented by the following table:

TABLE A
Resorcinol
Catechol
Hydroquinone
Pyrogallol
Phloroglucinol
p,p'-Isopropylidenediphenol
Tetrachloro-p,p'-isopropylidenediphenol or the alkylated derivatives thereof, such as:

Hexyl resorcinol
3-normal-propylcatechol
3-isopropylcatechol
4-isopropylcatechol
Tertiary-butylcatechol
3,5-dihydroxytoluene and others.

Mixtures of two or more of these polyphenols or mixtures of these polyphenols with a monohydric phenol, such as phenol per se, are contemplated. The amount of any one of the phenolic compounds may be from about 5 to about 95 molar percent of the phenolic mixture. The rest is the other phenol.

In order to provide the polyfunctional phenols contemplated by this invention, one or more of the foregoing mononuclear phenols are reacted with a bis-(halomethyl) substituted benzene, such as:

TABLE B
Bis-(chloromethyl)benzene (ortho, meta, or para)
Bis-(chloromethyl)toluene
Bis-(chloromethyl)xylene
1,6-bis-(chloromethyl)-p-xylene
4,6-bis-(chloromethyl)-m-xylene
Bis-(chloromethyl)mesitylene
Bis-(chloromethyl)durene A mixture of bis-(chloromethyl)xylenes derived from the chloromethylation of commercial xylenes is an especially economic material for use in the process.

In order to effect reaction between the bis-(halomethyl) substituted benzene and the phenolic component, the two are mixed together in a ratio of approximately 1 mole of the bis-(halomethyl) substituted benzene to 2 moles of the phenolic component. An excess, e.g., a 100 percent excess of the phenolic component may be employed. The reaction may be effected, if desired, in an appropriate solvent which is non-reactive with respect to the mixture and which includes such materials as:

TABLE C

Dioxane    Xylene
Toluene    Dimethoxyethane

Higher boiling ethers of glycols, or other non-reactive solvents in general, boiling at a temperature, for example, in a range of about 75° C. to about 180° C. may be used. Very good results are obtained with solvents boiling between about 100° C.–120° C.

Under these conditions, reaction to form the polyfunctional phenol of the structure previously described takes place, hydrochloric acid being evolved and eliminated from the system in a volatile vapor phase to cause the reaction to proceed to completion. The desired polyfunctional phenol is obtained in a high yield. The time is short or long dependent upon temperature and the reactants, but may be within a range of about 5 to 150 hours. Cessation of the evolution of hydrogen halide is a criterion of completion of the reaction.

Various uses for the resultant polyfunctional phenols are contemplated. For example, such uses include the destruction of living organisms, such as fungi, bacteria, parasites, and the like. For these uses it is contemplated to dissolve the polyfunctional phenol compounds in appropriate solvents, such as a hydrocarbon, or to disperse the same or a sodium salt thereof in an aqueous medium. They may also be reacted with formaldehyde or a substance reacting as formaldehyde, e.g., paraformaldehyde, to provide phenolic resins.

However, the polyfunctional phenols of this invention are regarded as being of particular value in the preparation of polyglycidyl ethers by reaction of the polyphenols with epichlorohydrin in the presence of an excess of a base such as caustic soda. The products are adapted to cure with various curing agents.

These polyglycidyl ethers are of the approximate structure:

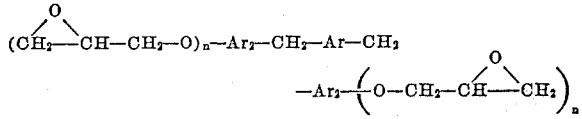

wherein Ar represents an arylene radical. Each $Ar_2$ represents an organic radical including at least one aromatic structure. Preferably, each $Ar_2$ is a hydrocarbon radical including one or two benzenoid groups in the structure. The $Ar_2$ groups may be the same or different. Each $n$ in the above structure is a whole number from 2 to 5, and preferably from 2 to 4.

The reaction of the epihalohydrin and the complex polyphenol may be represented as follows, wherein sodium hydroxide, epichlorohydrin and the complex polyphenol from the reaction of resorcinol and 4,6-bis-(chloromethyl)-m-xylene are utilized for illustrative purposes:

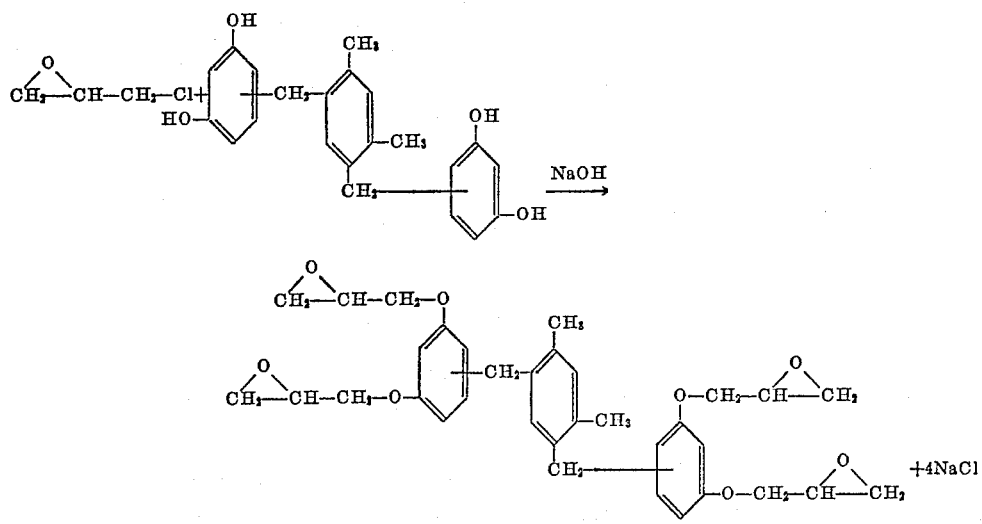

In carrying out the reaction of the type depicted above it is generally desirable to utilize an amount of the epihalohydrin which is from about 2 to 20 times equivalency with respect to the hydroxyls of the polyphenol. As the amount of the epihalohydrin approaches equivalency with respect to the hydroxyls, the chain length of the polyglycidyl ether increases and the viscosity thereof increases. It is usually preferred to maintain the amount of epihalohydrin sufficiently high so that the polyglycidyl ether is liquid or fusible. Any excess of epihalohydrin present acts as a solvent for the mixture, and can be removed at the end of the reaction, for example, by distillation.

The polyglycidyl ethers of this invention may be hardened by the agents recognized in the curing of polyglycidyl ethers of p,p′-isopropylidenediphenol. These cross link the polyglycidyl ether molecules. In many instances, the curing reaction of the polyglycidyl ethers of this invention takes place at an exceptional speed, thus adapting the material for certain applications where short curing schedules are desirable. Curing speed can be adjusted by proper selection of the amount and kind of curing agent to meet almost any reasonable demand.

The polyglycidyl ethers, after removal of excess epichlorohydrin, are usually very viscous to solid, brittle materials, but they can readily be liquefied by heating, or, if desired, by dissolving in solvents or reactive diluents such as the diglycidyl ether of 1,4-butanediol. It is usually desirable to liquefy them by melting and then to incorporate the curing agents, such as amines, acid anhydrides, sulfones and others recognized in the art of curing epoxy resins.

Appropriate curing agents include the following:

TABLE D

Anhydrides, e.g.,

Methyl nadic anhydride*

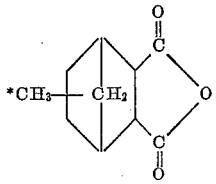

Dichloromaleic anhydride
Chlorendic anhydride
Phthalic anhydride
Pyromellitic anhydride Amines, e.g., Methylene dianiline
Metaphenylene diamine
Polyamines
Polyamides of polyamines and dimer acids
Diaminodiphenyl sulfone and others capable of combining with the epoxy groups to interlink the same. Polyamides useful in curing the glycidyl polyethers of this invention are represented by the reaction products of polyamines and acids as long chain dicarboxylic acids. The polyamides containing free reactive amine groups obtained by reacting dimer acids and polyamines, as described in U.S. Patents 2,450,940 and 2,705,223, are good examples.

The epoxy resin and the curing agent are ordinarily employed in equimolar amounts. The curing agent can be added to the epoxy resin simply by agitating a mixture of the two.

The mixtures of the polyglycidyl ethers of this invention and the curing agents are then poured into molds, applied to non-permeable backings or are used to impregnate fibrous materials or are otherwise disposed for curing in well known manner and are cured by heating to an appropriate temperature as for example, from about 100° C. up to a temperature of about 200° C. or to other appropriate curing temperatures. Obviously, the temperature should be below the point at which the mixture or the components thereof will decompose.

If desired, the resin and a curing agent, such as is herein disclosed, may be dissolved in an appropriate solvent, such as acetone and methyl ethyl ketone, and the solution used to impregnate reinforcing and/or filling agents, such as glass fibers, asbestos or the like. When the solvent has evaporated, the resin mixture is stable at room temperature, but may be cured, for example, by baking, thus giving a product of good hardness and high heat distortion characteristics. Needless to say, the resin and the curing agent can be dissolved separately and the solutions can be mixed to provide the complete impregnating solution.

The novel epoxy resins of this invention are also useful as the resinous component of surface coatings such as are utilized on appliances, metal furniture, and the like. For this application, the epoxy resins are simply dissolved in a suitable solvent and applied to the substrate per se, or they may be formulated with other resins, pigments and other components commonly employed in coating compositions.

The following examples illustrate the preparation of a polyphenol which can be reacted with an epihalohydrin in accordance with the provisions of this invention to form valuable polyglycidyl ethers.

Example A

In this example resorcinol is reacted with dichlorodurene [4,6-bis-(chloromethyl)-m-xylene] to form a tetraphenol believed to be predominantly of the formula:

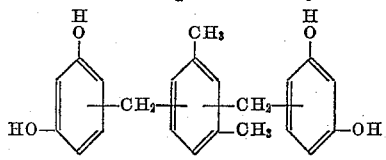

and may be termed bis-(1,3-hydroxyphenylmethyl)-m-xylene. The reaction mixture comprises:

| | Grams |
|---|---|
| Bis-(chloromethyl)-m-xylene | 220 |
| Resorcinol | 203 |

The mixture is dissolved in a non-reactive diluent; namely 422 grams of dioxane, by heating to a temperature of about 74° C. The apparatus comprises a 2-liter, 3-necked flask equipped with a condenser, a thermometer, an agitator, and a heating device, such as a mantle. The dissolved mixture is reacted by heating the same at about 90° C. to about 95° C. for about 35 to 45 hours. Reaction is evidenced by evolution of hydrochloric acid, which ceases as the reaction near completion. This evolution constitutes a good criterion of the rate and stage of the reaction. The mixture is then blown with inert gas (e.g., combustion gas) and the temperature is further raised to about 97° C. or until hydrochloric acid ceases to evolve and the sample shows a hydroxyl value of about 580.

The product is largely a tetraphenol of the foregoing formula, useful for such purposes as the preparation of polyglycidyl ethers of the type employed in forming novel epoxy resins of high heat distortion. The polyol may also be mixed with formaldehyde or paraformaldehyde and reacted to provide a phenolic resin.

The following example illustrates the reaction of the tetraphenol from the reaction of Example A to provide a tetraglycidyl ether useful for reacting with curing agents such as dicarboxylic acids or anhydrides thereof or with amines and amides.

Example I

In this example the tetrapolyphenol of an OH value of 580 and being derived from resorcinol and dichlorodurene as described, is employed as the phenolic component in forming a polyglycidyl ether. The components are employed in the following proportions:

| | Parts By Weight | Equivalents |
|---|---|---|
| Tetrapolyphenol | 176.5 | 1 |
| Epichlorohydrin | 1,390.0 | 32 |
| Sodium Hydroxide | 72.9 | 4 |

In conducting the reaction, the epichlorohydrin and the tetrahydroxyphenol are first heated to about 100° C., at which point the addition of the sodium hydroxide is initiated. The temperature is then increased to 116° C. and the rest of the caustic is added over a period of two hours. Heating is continued at 116° C. for an additional period of approximately five hours, or until about 28 milliliters of water has been collected.

The reaction solution may be filtered to remove salt formed in the reaction by means of a conventional Buchner funnel having a sheet of filter paper upon a diatomaceous earth filter bed and, if desired, may be further filtered, for example, through a fritted glass funnel. Excess epichlorohydrin is readily removed from the tetraglycidyl ether by distillation under a vacuum of about 20 millimeters of mercury (upon an absolute scale) and at a temperature of 155° C. The epoxy equivalent (grams of resin containing one gram equivalent of epoxide) of the product is 204.3 and the yield is 90.3 percent.

The tetraglycidyl ether product can be mixed with curing agents in amounts approximating theoretical equivalency upon the basis of the epoxy content and cured to provide a useful epoxy resin. Castings and laminates can thus be formed. Curing agents contemplated in such mixture comprise methylene dianiline, chlorendic acid anhydride, diaminodiphenyl sulfone of the formula:

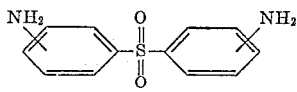

and others.

*Example II*

Example I is repeated, but the relative proportion of the epichlorohydrin with respect to the tetraphenol used to form the polyglycidyl ether in the example is reduced to one half that of the former example. The epoxy resin product is similar to that of Example I.

*Example B*

In this example, p,p'-isopropylidenediphenol is reacted with 4,6-bis-(chloromethyl)-m-xylene to provide a compound believed to be predominantly of the formula:

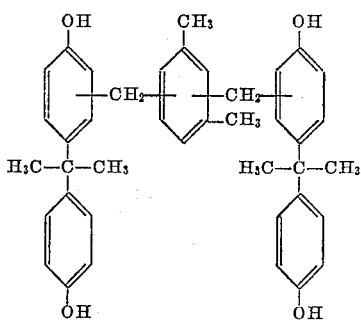

In conducting the reaction, the following charge is employed:

| | Parts by weight |
|---|---|
| Bis-(chloromethyl)-m-xylene | 203 |
| p,p'-Isopropylidenediphenol | 456.6 |

The solvent employed in the reaction comprises 422 grams of dioxane. The change is placed in a 3-liter, 4-necked flask equipped with an inlet for inert gas, a thermometer, a mechanical stirrer, and a condenser for water. The flask containing the reactants is heated in an oil bath under a laboratory hood to a temperature in a range of about 96° C. to 105° C. and for a total time of about 46 hours, at the end of which time, the reaction is complete. Volatile materials, including solvent, are stripped off by heating the flask in an oil bath to 110° C. and at a pressure of 20 millimeters of mercury (absolute). The desired tetraphenol product has a hydroxyl value of 392 as against theoretical value of 382 calculated upon the basis of 100 percent solids. The yield is 98.2 percent by weight.

*Example III*

This example is designed to show by a series of tests the merits, as high heat distortion products, of the resins resulting from the curing with suitable agents of polyglycidyl ethers obtained from epichlorohydrin and the polyphenols of this invention.

The plate-like samples for the tests are in each instance prepared by heating the polyglycidyl ether to about 110° C.–115° C. until it is sufficiently fluid to admit of ready incorporation of the curing agent. The latter, in equivalent amount based upon the epoxy value of the resin, is incorporated and the mixture is poured into a preheated cell formed from a pair of glass plates spaced ⅛ inch apart by a suitable gasket.

The resin is cured for 1 hour at 110° C. and finally for 2 hours at 180° C. The resultant cured resins are tested for heat distortion in accordance with ASTM method D648–45T.

The following sample plates were so tested:

SAMPLE PLATE 1

This sample plate is employed as a control or standard and is composed of a commercial casting resin known as Shell resin, Epon 828. It is a conventional type of polyglycidyl ether of p,p'-isopropylidenediphenol and epichlorohydrin of an epoxy value of about 190 to 210. It was selected for this test because it is a leading commercial casting epoxy resin.

The curing agent employed is a commercial product known as Shell curing agent Z which is an eutectic mixture of metaphenylene diamine and methylene dianiline having an equivalent weight of about 39.5.

This mixture, when cured and tested, has a heat distortion temperature of 140.5° C.

SAMPLE PLATE 2

The glycidyl polyether of this sample is from a tetraphenol resulting from reacting the following components:

| | Moles |
|---|---|
| Resorcinol | 2 |
| Bis-(chloromethyl)-m-xylene | 1 |

The reaction is conducted at 93° C.–95° C. over a period of 72½ hours.

The tetraphenol product is of a hydroxyl value of 554 as against a theoretical value of 642.

This polyphenol, in a ratio of 1 mole is mixed with 32 moles of epichlorohydrin and 4 moles of caustic soda, and is heated 4½ hours at a temperature of 116° C. The salts are filtered off and the excess epichlorohydrin is distilled off under vacuum.

The resultant glycidyl polyether is of an epoxy equivalent of 163 as against a theoretical equivalent of 158.5. The yield is 88.6 percent.

This polyglycidyl ether, when mixed with an equivalent amount of methylene dianiline and cured in the manner described, gives a hard resin having a heat distortion value of 174° C. This is 33.5° C. higher than that of the control.

SAMPLE PLATE 3

The tetraphenol obtained by reaction of p,p'-isopropylidenediphenol and bis-(chloromethyl)-m-xylene as disclosed in Example B, is reacted with an excess of epichlorohydrin in the presence of a hydrogen halide acceptor, namely, sodium hydroxide. The reaction charge comprises:

| | Parts by weight |
|---|---|
| Tetraphenol (as per Example B) | 220.7 |
| Epichlorohydrin | 1125.0 |
| Sodium hydroxide (added in increments as subsequently described) | 60.0 |

In conducting the reaction, the tetraphenol and epichlorohydrin are charged into a 2-liter, 4-necked flask equipped with a glass stopper, and azeotropic trap, a reflux condenser, a mechanical agitator, a thermometer and means for supplying heat. To the mixture is added 25 grams of NaOH and the mixture is refluxed at a temperature of 116° C. and 15 gram quantities of NaOH are added over a period of approximately 1 hour. The mixture is further heated for 13 hours at 116° C. during which time 25 parts by weight of water are collected.

The reaction mixture is filtered to remove salt and the excess of epichlorohydrin in the reaction mixture is stripped off under vacuum until a temperature of 150° C. is reached.

A yield of about 281.4 parts by weight of tetraglycidyl ether is obtained. This product has an epoxy equivalent of 239 as compared with a theoretical equivalent of 202.

To the resultant polyglycidyl ether is added an approximately equivalent amount of a curing agent, namely methylene dianiline. The mixture is then cast into a mold and is cured by heating at 230° F. for 1 hour and at 356° F. for 4 hours. The resultant casting has a heat distortion of 182° C. This value is 41.5° C. higher than the control.

SAMPLE PLATE 4

The polyphenol utilized in the preparation of this plate is the reaction product of:

| | Moles |
|---|---|
| p,p′-Isopropylidenediphenol | 2 |
| 1,4-bis-(chloromethyl)-benzene | 1 | the temperature of reaction being 103° C.–119° C. and the time being 40¾ hours.

The polyphenol is of a hydroxyl value of 304.5 as against a theoretical value of 403. The yield is 93.4 percent.

The variation of the hydroxyl value from theoretical value is presumed to be due, at least in part, to ether formation.

This polyphenol is mixed with epichlorohydrin in a ratio of 32 moles and caustic soda in a ratio of 4 moles. The mixture is cooked for 2¾ hours at 116° C. The epoxy equivalent of the product is 274 as against a theoretical equivalent of 240.

This polyglycidyl ether is mixed with the calculated amount of curing agent; namely, Shell curing agent Z and cast and cured as already described.

The resin has a heat distortion value of 166° C., which is 25.5° C. higher than the control.

SAMPLE PLATE 5

The polyphenol of this example is of:

| | Moles |
|---|---|
| p,p′-Isopropylidenediphenol | 2 |
| 4,6-bis-(chloromethyl)-m-xylene | 1 |

The mixture is cooked at 92° C.–114° C. for 40 hours. The polyphenol has a hydroxyl value of 330 as against a theoretical value of 366. The yield is 94.8 percent.

A mole of the polyphenol is mixed with 32 moles of epichlorohydrin and 4 moles of caustic soda, and the mixture is cooked at 116° C. for 3 hours to provide a glycidyl polyether of an epoxy number of 290 as against a calculated number of 226.

The product is mixed with an equivalent amount of Shell curing agent Z and is cured by heating in accordance with the foregoing schedule.

The heat distortion point of the resin is 185° C. which is an increase of 44.5° C. as compared with the control (Sample Plate 1).

*Example C*

In accordance with this example, the compound of the formula:

which may be termed 1,4-bis-(chloromethyl)-benzene, is reacted with resorcinol to form predominantly the corresponding tetraphenol of the formula:

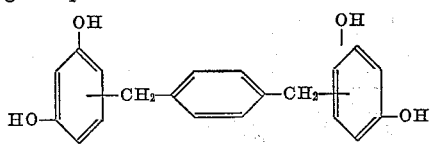

The reaction vessel comprises a 2-liter, 4-necked flask equipped with an inlet for inert gas, a stirrer, a thermometer and outlet tube permitting the escape of gases to the hood. The reaction charge comprises:

| | Parts by weight |
|---|---|
| 1,4-bis-(chloromethyl)-benzene | 263 |
| Resorcinol | 330 |

The mixture in the flask is refluxed gently for a total of 128 hours. The product is stripped of excess solvent and other volatile materials on an oil bath at 110° C. and at a pressure of 20 millimeters of mercury (absolute). The yield is 94.5 percent.

*Example IV*

In accordance with this example, the complex polyphenol from Example C is reacted with epichlorohydrin to form predominantly the corresponding polyglycidyl ether of the formula:

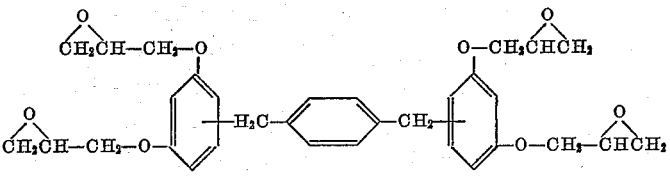

The reaction mixture comprises:

| | Parts by weight |
|---|---|
| Tetraphenol (as per Example C) | 201 |
| Epichlorohydrin | 1555 |
| Sodium hydroxide | 84 |

The polyol and epichlorohydrin are charged into a 4-necked flask equipped with a stirrer, a thermometer, an azeotropic trap and a condenser. In order to conduct the reaction, the polyol and the epichlorohydrin are added to the flask and the mixture is heated to 116° C. The sodium hydroxide, constituting a hydrogen chloride acceptor, is added in approximately equal increments averaging slightly in excess of 10 parts by weight until a total of 85.3 parts have been incorporated. The reaction mixture is heated for a total of about 5 hours and the reaction product is then filtered through a fritted glass funnel in order to remove salt of reaction. The polyglycidyl ether is obtained in a yield of approximately 96.2 percent and is of an epoxy value of 187. This polyglycidyl ether reacts very rapidly with many curing agents.

*Example D*

This example illustrates the preparation of a complex polyphenol, principally a hexaphenol. In the reaction, a mixture is prepared comprising:

| | Moles |
|---|---|
| Pyrogallol | 2 |
| Bis-(chloromethyl)-m-xylene | 1 |

The charge is cooked at 100° C.–130° C. for 9¾ hours to provide a product of a hydroxyl value of 802.6. The yield is 91 percent.

*Example V*

A mole of the charge from Example D is mixed with 32 moles of epichlorohydrin and 4 moles of caustic soda and the mixture is cooked at 116° C. for 5 hours. The yield of product is 97.7 percent. This material may be mixed with curing agents such as Shell curing agent Z and cured.

*Example E*

In this example, a complex polyphenol is prepared by reacting a mixture of 2 moles of phloroglucinol and 1 mole of bis-(chloromethyl)-m-xylene at a temperature of 98° C.–123° C. for 29½ hours. The polyphenol product has a hydroxyl value of 651 as against a theoretical value of 645.

This product can be reacted with an excess of epichlorohydrin and caustic soda to provide a glycidyl polyether. The latter in turn can be cured with Shell curing agent Z as already described to provide an epoxy resin.

Example F

This example illustrates the use of a mixture of phenols in forming the products of this invention. The charge employed in forming the polyol comprises:

| | Moles |
|---|---|
| Phenol | 1 |
| Resorcinol | 1 |
| Bis-(chloromethyl)-m-xylene | 1 |

The charge is cooked at a temperature of 86° C.–127° C. for 48 hours to provide an 89.1 percent yield of a product of a hydroxyl value of 420 as against a theoretical value of 504.

The polyglycidyl ether is formed by adding to 1 mole of the material, 32 moles of epichlorohydrin and 4 moles of caustic soda and heating the mixture for 3½ hours.

The polyglycidyl ether product can be cured with an equivalent amount of Shell curing agent Z or other appropriate curing agent recognized in the epoxy resin art.

In the several examples, illustrating the curing of the polyglycidyl ethers, other curing agents than those mentioned in the examples may be employed. The function of these curing agents is to cross link polyglycidyl ether molecules. The cross linking agents usually will contain a plurality of points or groups adapted to link themselves to the epoxy groups of said polyglycidyl ether molecules.

It is presently considered that the epoxy resins resulting from the reaction of a diphenol such as resorcinol, catechol, hydroquinone or p,p'-isopropylidenediphenol with bis-(chloromethyl)-m-xylene are quite superior to the corresponding products from the monohydric, or trihydric phenols. However, the use of the latter under some circumstances is not precluded, since they do contain a plurality of functioning hydroxyls which render them useful for certain purposes.

While specific examples have been set forth hereinabove, it is not intended to limit the invention solely thereto, but to include all of the variations and modifications falling within the scope of the appended claims.

We claim:

1. A resinous polyglycidyl ether of a polyphenol of the structure

wherein Ar represents a phenylene radical, and each $Ar_1$ represents a radical derived by removing a hydrogen atom from a nuclear carbon atom of a phenol containing at least two phenolic hydroxyl groups.

2. The resinous polyglycidyl ether of claim 1 wherein Ar is a methyl substituted phenylene radical.

3. The resinous polyglycidyl ether of claim 1 wherein Ar is a dimethyl substituted phenylene radical.

4. A polyglycidyl ether of the structure

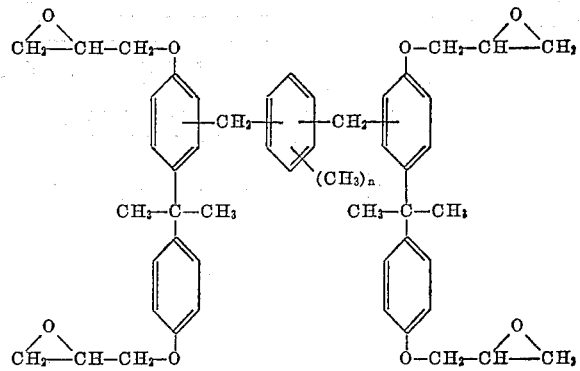

wherein $n$ is a whole number from 0 to 4.

5. A polyglycidyl ether of the structure

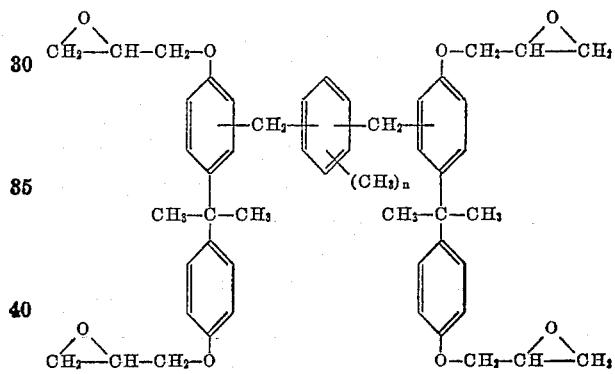

6. A polyglycidyl ether of the structure

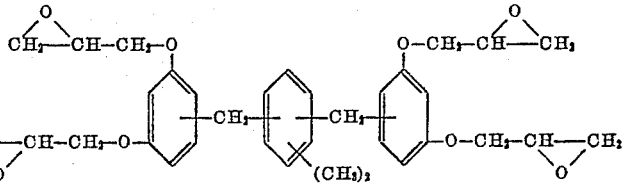

7. A polyglycidyl ether of the structure

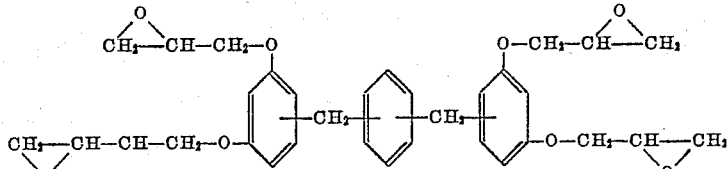

8. A polyglycidyl ether of the structure

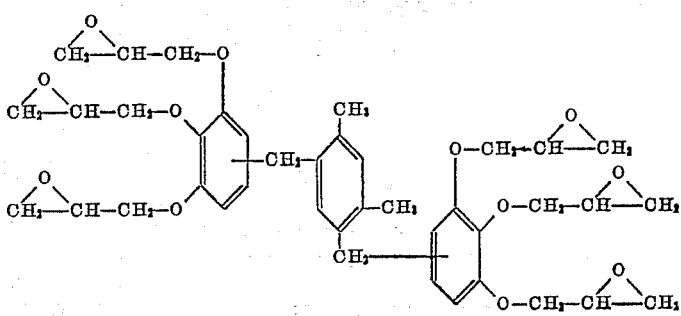

9. A polyglycidyl ether of the structure
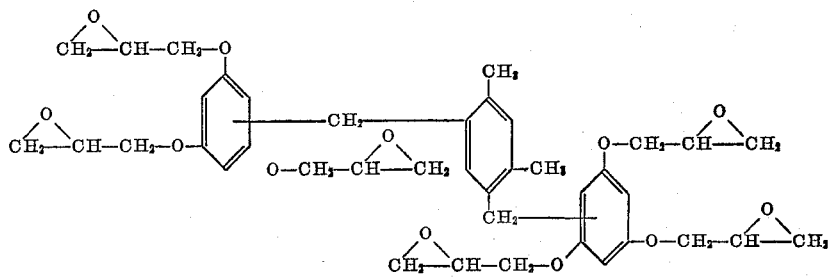
References Cited in the file of this patent
UNITED STATES PATENTS
2,865,887  Mackenzie _____ Dec. 23, 1958
FOREIGN PATENTS
789,392  Great Britain _____ Jan. 22, 1958